(12) United States Patent
Pinckney

(10) Patent No.: US 7,535,343 B1
(45) Date of Patent: May 19, 2009

(54) HOLDING DEVICE ATTACHABLE TO A VEHICLE

(76) Inventor: Michael M. Pinckney, 3331 Summit Blvd., Suite 27, Pensacola, FL (US) 32503

(*) Notice: Subject to any disclaimer, the term of this patent is extended or adjusted under 35 U.S.C. 154(b) by 350 days.

(21) Appl. No.: 11/703,872

(22) Filed: Feb. 9, 2007

(51) Int. Cl.
*B60Q 1/00* (2006.01)

(52) U.S. Cl. .............. 340/425.5; 340/468; 340/691.1; 340/691.6; 340/693.5; 40/209; 40/210; 40/575

(58) Field of Classification Search .............. 340/425.5, 340/473, 468, 691.1, 691.6, 693.5; 40/606, 40/209, 210, 575, 591, 541, 611.01, 611.05, 40/611.06, 611.07; 362/497
See application file for complete search history.

(56) References Cited

U.S. PATENT DOCUMENTS

| 1,198,268 | A | 9/1916 | Peterson et al. |
| 1,219,236 | A | 3/1917 | Brewster |
| 1,381,038 | A | 6/1921 | Walshe |
| 2,035,659 | A | 3/1936 | Lindstrom |
| 2,093,620 | A | 9/1937 | Roessler |
| 2,802,292 | A | 8/1957 | Bader |
| 4,445,291 | A * | 5/1984 | Easley .................... 40/210 |
| 4,453,328 | A | 6/1984 | Connolly |
| 4,889,268 | A | 12/1989 | Shubeck |
| 5,645,203 | A | 7/1997 | Tappenden |
| 5,815,965 | A | 10/1998 | de Greeve |
| 5,850,957 | A | 12/1998 | Morris |
| 5,878,516 | A | 3/1999 | Taylor |
| 6,449,889 | B1 * | 9/2002 | Hottenstein ............... 40/575 |

* cited by examiner

*Primary Examiner*—Toan N Pham
(74) *Attorney, Agent, or Firm*—Peter Loffler

(57) ABSTRACT

A holding device attaches to the license plate screw bosses of a vehicle in the usual way and has a first receptacle with a first pair of slots for receiving a temporary driving tag and a second pair of slots, behind the first pair, for receiving an advertisement plate of the dealer. A second receptacle has an actuator that dispenses an information disc through a slot upon the depression of a switch. A delay circuit may provide a time delay between disc dispensing cycles. A lamp is controlled by a depression switch located within the first pair of slots so that a plate acts on the switch in order to illuminate the lamp for night test driving, which illumination may be overridden by a photoelectric cell for daytime use. Posts extend rearwardly of the second receptacle and have ears with openings through which screws pass and the screws received within the bosses. A stabilizer bar also extends rearwardly of the second receptacle.

20 Claims, 10 Drawing Sheets

HOLDING DEVICE ATTACHABLE TO A VEHICLE

BACKGROUND OF THE INVENTION

1. Field of the Invention

The present invention relates to a device that holds advertisement placards, temporary license plates, and advertisement media, such as brochures and DVDs, which device is attachable to the standard license plate screw bosses of a vehicle.

2. Background of the Prior Art

Car dealerships are busy and hectic places where buyers and sellers meet in order to try to place a vehicle, either new or used, with a buyer at a price that is acceptable to both the buyer and seller. One aspect of the sales process that is experienced countless times a day is the test drive. A buyer, upon seeing a vehicle that may be of interest for purchase, gets behind the wheel of the vehicle and road tests the vehicle in order to assess its road worthiness. This basic vehicle sales task is oftentimes the difference between a sale of the vehicle and a rejection, whereupon the buyer keeps looking. While a fairly standard routine, the test drive has certain inconveniences for the salesperson as well as the buyer. As it is customary, due to the expense involved, not to tag each individual vehicle on a given dealership lot, prior to taking the vehicle off of the lot, a temporary license tag must be affixed to the vehicle.

One method used by dealers to tag a vehicle for a test drive is to magnetically attach a plate to an appropriate location on the vehicle such as the trunk lid. Magnets affixed to the back surface of the license tag couple to an appropriate metal surface on the body of the vehicle and remain thereat during the test drive. Upon completion of the test drive, the license tag is decoupled from the vehicle and stored as desired for subsequent use on another vehicle. Although this method works reasonably well, it is not without shortcomings. The magnetic contact of tag to vehicle can lead to scratches being left on the vehicle. Such scratches result in the need for the detail department to spend time and effort (and of course money of the dealership) in order to remove the scratches. In serious situations, such as those involving high-end luxury vehicles, the scratches can result in a rejection of acceptance of the vehicle by the putative buyer. Additionally, such tags can become dislodged and fly off of the vehicle during the test drive resulting in the expense of replacement of the tag and possibly the costs of repairing another vehicle on the road that is struck by the dislodged low flying tag, neither result desired by the dealership. Some jurisdictions, recognizing the potential for harm caused by a dislodged tag during a test drive, specifically prohibit magnetic attachment of temporary tags to vehicles being test driven.

To combat the shortcomings of using a magnetically adhered tag, many dealers install a tag in the usual way by screwing the tag to the existing license plate screw bosses located at the front and rear of the vehicle, although many dealers only attach a rear tag during a normal test drive. Many vehicle dealers place a dealership advertisement tag in the normal license plate position during the initial vehicle prep work which tag is one component of the dealership's advertisement scheme. Accordingly, the salesperson must remove this advertisement tag prior to installation of the license plate tag used for the test drive. Upon completion of the test drive, the license plate tag must be removed and the dealership advertisement tag, if not inadvertently misplaced, which can happen during a typical hectic sales effort, replaced. Although relatively simple, such a process is inconvenient and time-consuming for both the salesperson and the customer and results in a higher level of frustration for each during the sales process.

Another aspect of the car purchasing process that gives car dealers pause involves the after-hours shopper. A large portion of would-be vehicle purchasers frequent car dealerships after hours when such shoppers can stroll the lot freely and inspect various vehicles without the added stress of the presence of a salesperson. Such buyers, either through demand of schedule, or simply the desire to shop free of sales pressures, attend the lots outside of the business hours of the dealership. Once a desired vehicle is identified, such shoppers make contact with the dealership either telephonically or by visitation during regular business hours of the dealership. The problem for the dealership in attending to such after hours shoppers is the fact that, due to the absence of a salesperson that can pump up the various vehicles on the lot, the potential buyer may not be exposed to the most desirable features of a particular vehicle. Although the buyers can do research on-line after visiting the dealership, many would-be buyers may not place certain vehicles on their desirable list simply through visual inspection of the vehicle and the perceptions attained therefrom. Although the vehicle may have most, if not all of the features desired by a buyer, the buyer may never learn of such qualifications of the vehicle and may never consider the vehicle for purchase. Without the presence of a salesperson on the lot after hours, the dealer faces challenges in informing the would-be buyer of the desirability of certain vehicles on the dealer's lot.

Accordingly, there exists a need in the art for a system that can assist a vehicle dealership in the sales process, which system addresses the aforementioned short comings currently found in the art. Specifically, such a system must allow a salesperson to quickly and securely attach a license tag to a vehicle in order to make the particular vehicle legal for road testing. Such attachment must be achieved without fear of scratching or scuffing the body of the vehicle in order to prevent diminution of the value of the vehicle. The attachment process must be relatively quick and easy so that it does not unnecessarily burden either the salesperson or the potential buyer, each of whom may have a busy schedule. The attachment of the tag to the vehicle must be relatively secure in order to minimize the potential for the tag becoming dislodged during road testing of the vehicle so as to prevent loss of the tag and/or damage to other vehicles on the road. Such a tag attachment system should work in harmony with any advertisements secured to the vehicle in the tag receptacle areas of the vehicle. The system should be able to offer a potential buyer, present in the lot when no salesperson is available, advertisements and other pertinent details about the particular vehicle being inspected or at least the make and model of the vehicle in order to allow a potential buyer to have the ability to decide whether a given vehicle meet's the would-be buyer's criteria for a vehicle. Ideally, such a system should be of relatively simple design and construction and must be easy to install, maintain, and use.

SUMMARY OF THE INVENTION

The holding device attachable to a vehicle of the present invention addresses the aforementioned needs in the art by providing a device the serves dual roles for a vehicle dealership and its would-be buyers. Specifically, the holding device attachable to a vehicle allows a salesperson to quickly and securely attach a license tag to a vehicle employing the device so that the vehicle is legal for road testing. The attachment of the license plate to the vehicle does not require the tag to be attached magnetically or otherwise to a body panel of the vehicle so that the potential for scratching or scuffing the body of the vehicle is eliminated. Attachment of the license plate to the vehicle is relatively quick and easy so that it does not unnecessarily burden either the salesperson or the potential buyer. The attachment of the tag to the vehicle is relatively secure so that there is little danger of the tag becoming dislodged from the vehicle, with the attendant risk of loss of the tag and/or damage to other vehicles eliminated. The holding device attachable to a vehicle works in harmony with any advertisements secured to the vehicle in the tag receptacle areas of the vehicle so that the dealership maintains a high advertising profile, a necessity for a highly successful dealership. The holding device attachable to a vehicle is capable of offering a potential buyer, present in the lot when no salesperson is available, advertisements and other pertinent details about the particular vehicle being inspected in order to allow the would-be buyer to be able to review the various specifications of the vehicle at leisure. The holding device attachable to a vehicle is of relatively simple design and construction and is easy to install, maintain, and use.

The holding device attachable to a vehicle of the present invention is comprised of a first receptacle that has opposing sidewalls joined by a bottom wall forming a closed bottom and an open top. An optional transparent face portion is held by the sidewalls and the bottom wall while a first pair of slots extend downwardly from the open top to the closed bottom on each of the sidewalls and a second pair of slots extend downwardly from the open top to the closed bottom on each of the sidewalls parallel to the first pair of slots. A second receptacle is attached to the first receptacle such that the second receptacle has an internal chamber with an actuator and a power source therein. A switch is electrically connected to the power source and the actuator such that depression of the switch causes an arm of the actuator to act on and dispense a disc held within the internal chamber out of the internal chamber through a slot located on the second receptacle. A pair of posts extends from the second receptacle such that each of the pair of posts has an ear with an opening thereon. The opening on each ear of each post aligns with a respective one of the pair of screw bosses of the vehicle so that a screw passes through each opening in order to attach the device to screw bosses of the vehicle. A delay circuit may be provided and be electrically connected to the switch such that the delay circuit imposes a time delay between subsequent actuator activation cycles. A lamp is located within the first receptacle and is electrically connected to the power source while a depression switch is located within the first receptacle, between the first pair of slots, such that depression of the depression switch causes the lamp to illuminate. A photoelectric cell may be attached to the first receptacle such that the photoelectric cell measures ambient light and deactivates the lamp should the lamp be illuminated and the ambient light be above a threshold level. A stabilizer bar extends from the second receptacle and is coextensive with the pair of posts. A rack is provided and has a plurality of arms, each arm having a pair of third slots such that each of the pair of ears is receivable within a respective one of the pair of third slots.

BRIEF DESCRIPTION OF THE DRAWINGS

Similar reference numerals refer to similar parts throughout the several views of the drawings.

DESCRIPTION OF THE PREFERRED EMBODIMENT

Figure 1:
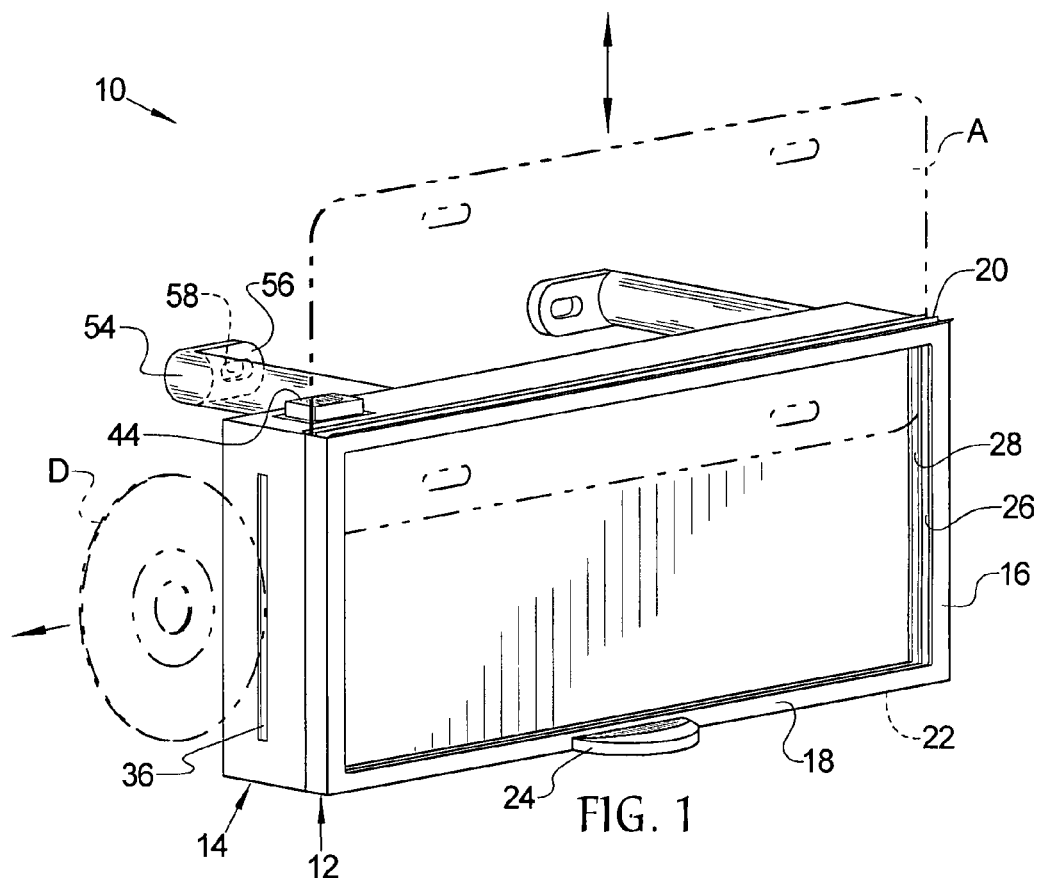
FIG. 1 is a perspective view of the holding device attachable to a vehicle of the present invention.
Figure 2:
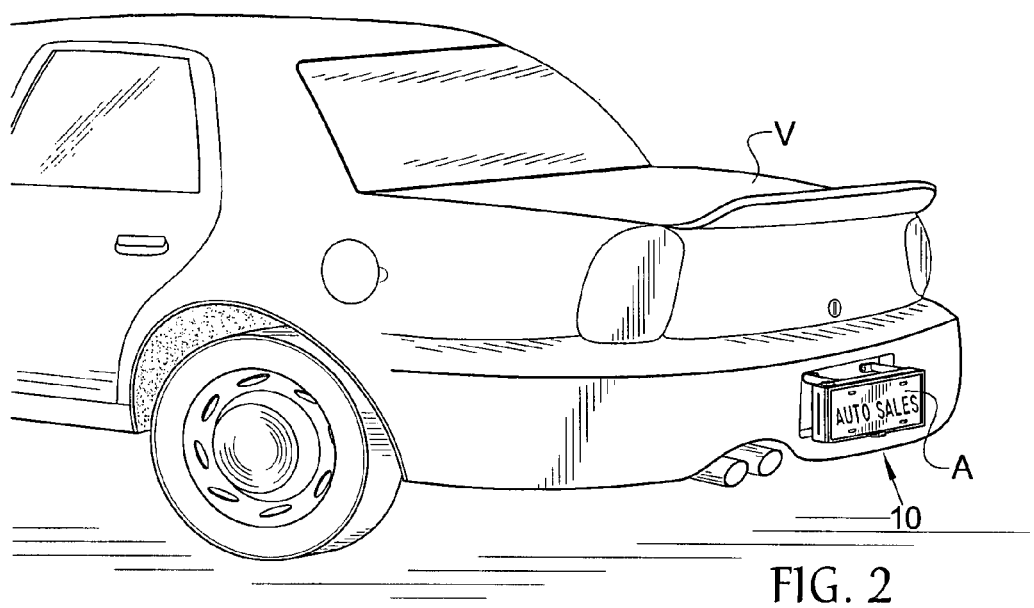
FIG. 2 is a perspective view of the holding device attachable to a vehicle attached to the rear of a vehicle.
Figure 3:
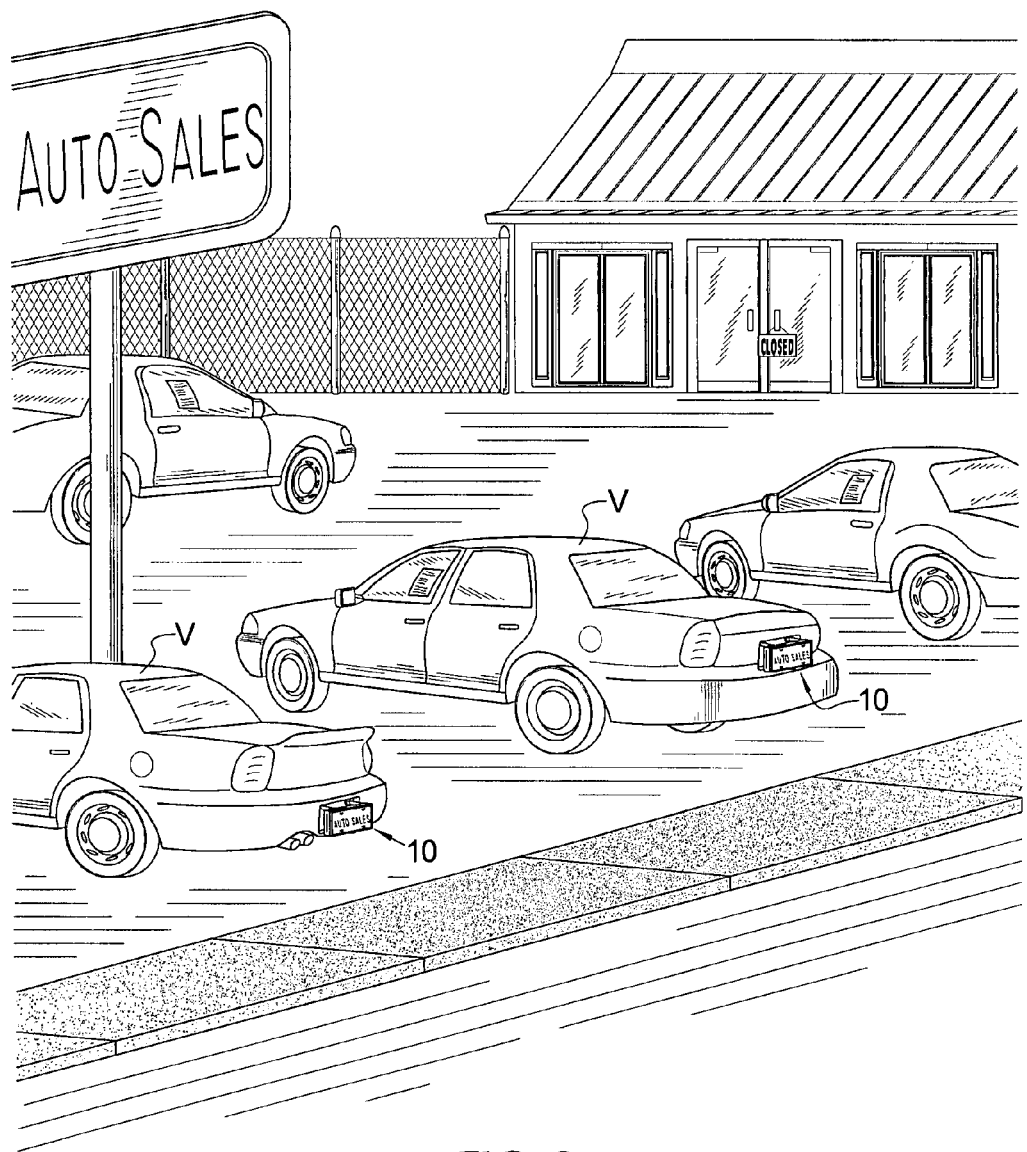
FIG. 3 is an environmental view of several of the holding devices attachable to a vehicle installed on various vehicles on a vehicle dealership lot.
Figure 4:
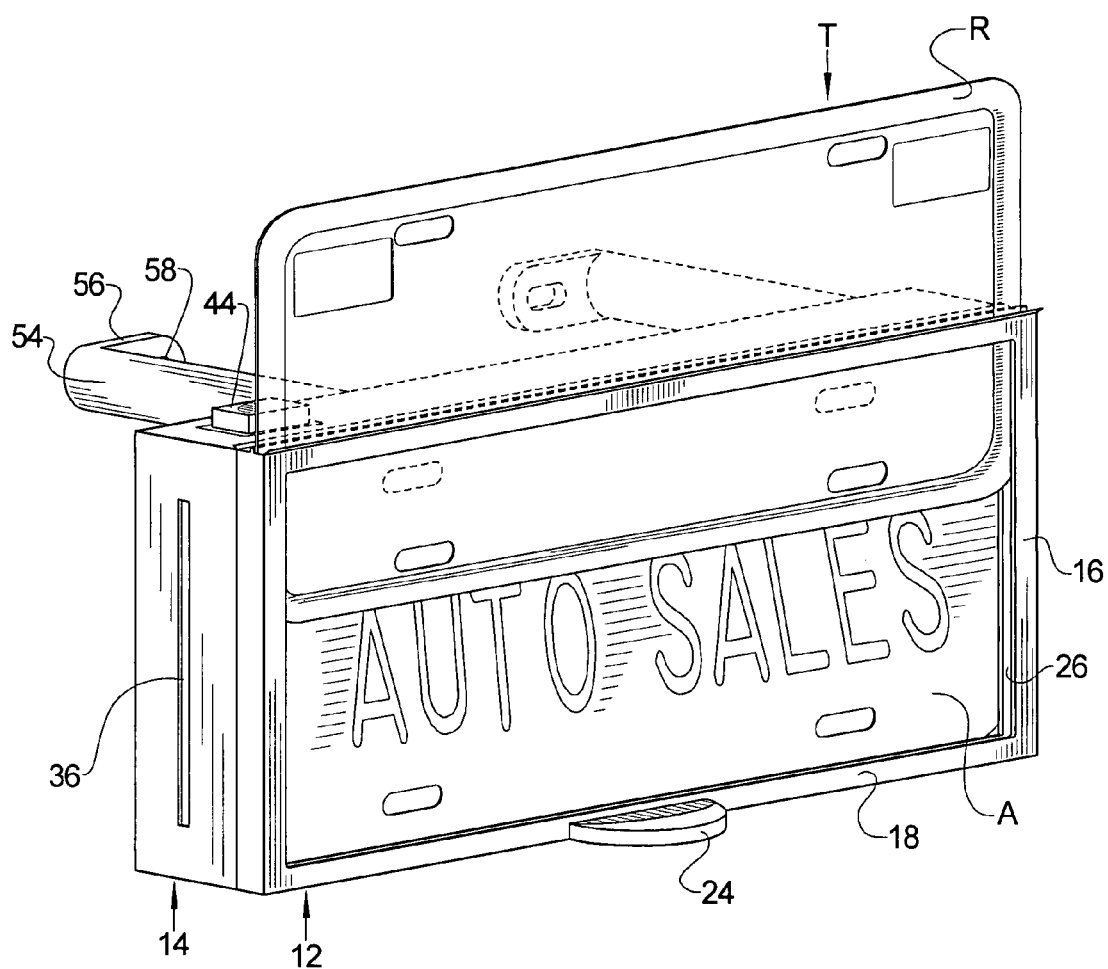
FIG. 4 is a perspective view of the holding device attachable to a vehicle with a dealership advertisement tag in place and a test drive license plate partially installed.
Figure 5:
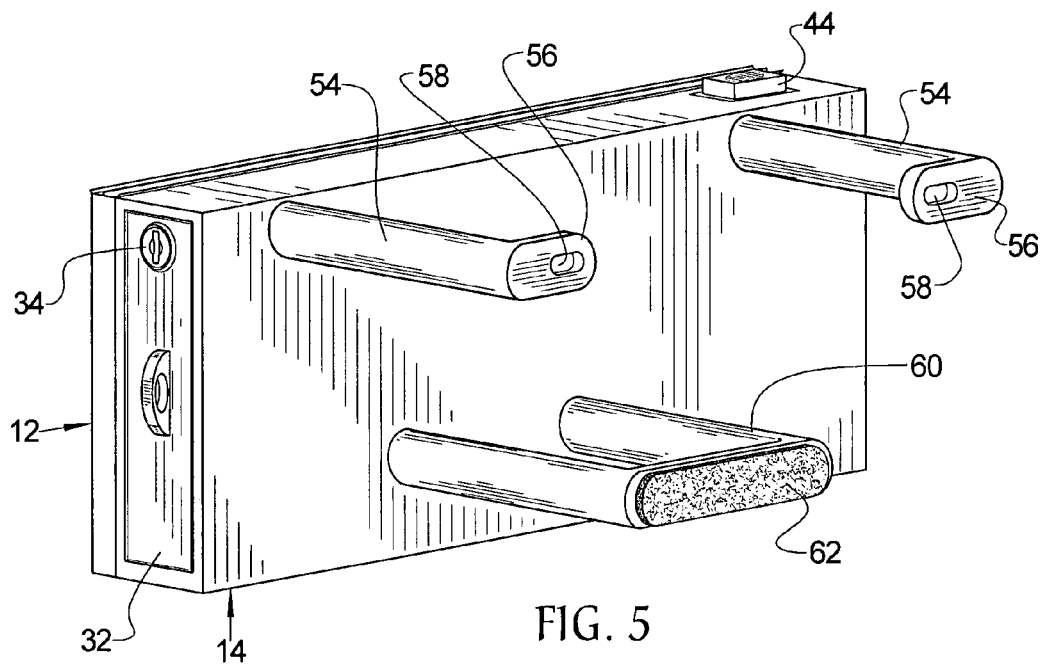
FIG. 5 is a perspective view, from the rear, of the holding device attachable to a vehicle.
Figure 6:
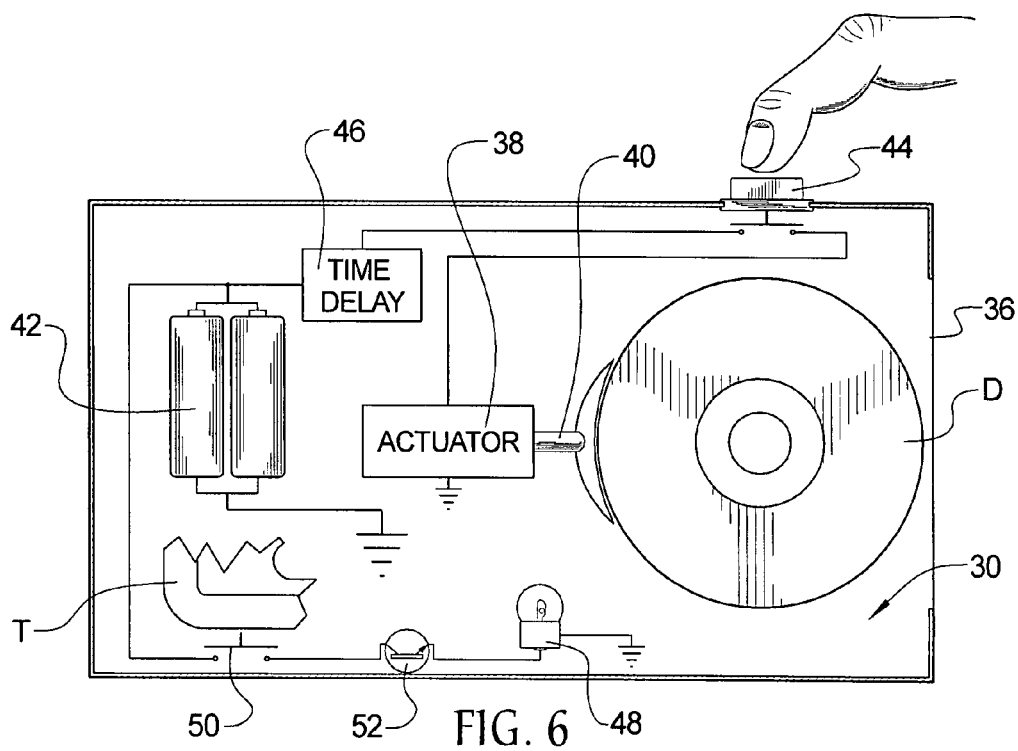
FIG. 6 is a schematic view of the internal operating components of the second receptacle of the holding device attachable to a vehicle.

Referring now to the drawings, it is seen that the holding device attachable to a vehicle of the present invention, generally denoted by reference numeral 10, is comprised of a first receptacle 12 and a second receptacle 14, located rearwardly from and attached to the first receptacle 12. As seen, the first receptacle 12 is a generally rectangular storage member that has opposing sidewalls 16 and a bottom wall 18. An optional protective face portion (not illustrated) may be provided and held by the sidewalls 16 and the bottom wall 18, which face portion is transparent and made from an appropriate material such as clear plastic. The first receptacle 12 also has an open top 20 and a closed bottom 22 with a lip 24 on the bottom if desired. A first pair of slots 26 are located within the first receptacle 12 and extend downwardly along the sidewalls 16 from the open top while a second pair of slots 28 are also located within the first receptacle 12 along the sidewalls and also extend downwardly from the open top 20 and are coextensive with one another and with the first pair of slots 26. The first pair of slots 26 along with the bottom wall 18 define a first tag reception area while the second pair of slots 28 along with the bottom wall 18 define a second tag reception area. The bottom wall 18 may have slots and join the respective first slots 26 and the second slots 28. The first tag reception area of the first receptacle 12 is dimensioned so as to be able to receive a standard sized license tag T used within the jurisdiction within which the device 10 is to be used such that the tag T is capable of being able to be slid into the first receptacle 12 so as to be received within the first pair of slots 26 and held by the bottom wall 18. Once received within the first tag reception area of the first receptacle 12, the tag T substantially fills the first tag reception area so that either side of the tag T is located proximate the sides of the sidewalls 16 and the top of the tag T is located proximate the open top 20 of the first receptacle 12. The depth of the first slots 26 is such that the tag T rests securely within the first pair of slots 26 without undue lean (the depth of the first slots 26 accommodates the typical license plate T rail R found on many such tags T). When the tag T is properly in place within the first receptacle 12, the functional viewable area of the tag T must be properly visible through the transparent face portion if used, or just the open space that would be occupied by the face portion.

Similarly, the second tag reception area of the first receptacle 12 is dimensioned so as to be able to receive an advertisement plate A desired by the dealership such that the plate A is capable of being able to be slid into the first receptacle 12 so as to be received within the second pair of slots 28 and held by the bottom wall 18. Once received within the second tag reception area of the first receptacle 12, the plate A substantially fills the second tag reception area so that either side of the plate A is located proximate the sides of the sidewalls 16 and the top of the plate A is located proximate the open top 20 of the first receptacle 12. The depth of the second slots 28 is such that the plate A rests securely within the second pair of slots 28 without undue lean. When the plate A is properly in place within the first receptacle 12, the functional viewable area of the plate A must be properly visible through the transparent face portion or just the open space that would be occupied by the face portion if no tag T is present within the first tag reception area.

As seen, the second receptacle 14 defines a disc dispensing device that has an internal chamber 30 with an access door 32 with a lock 34 thereon for gaining access to the internal chamber 30 therethrough and a dispensing slot 36 located on a side thereof. One or more discs D, which may be CDs, DVDs, etc., are stored within the internal chamber 30 with an actuator 38 also being disposed within the internal chamber 30, the actuator 38 (which may be a typical solenoid) having a dispensing arm 40. A power source 42, which may be one or more standard batteries, is electrically coupled to the actuator 38 as is an actuator switch 44 for controlling the actuator 38. A time delay circuit 46 is electrically connected to the switch 44 and to the actuator 38. Also located within the internal chamber 30 is a lamp 48 that is electrically connected to the power source 42. A depression switch 50 is located at the bottom wall 18 of the first tag reception area and is electrically connected to the lamp 48 as is a photoelectric sensor 52.

A pair of posts 54 extends rearwardly from the second receptacle 14 and each post 54 has an ear 56 with an opening 58 thereon, each ear 56 facing either inwardly or outwardly as desired. A stabilizer bar 60 also extends rearwardly from the second receptacle 14 and has a non-scuff pad 62 thereon The sidewalls 16 of the first receptacle 12, the second receptacle 14, the posts 54, and the stabilizer bar 60 are each made from an appropriate sturdy material, such as a metal or a hard plastic or a combination thereof.

In order to use the holding device attachable to a vehicle 10 of the present invention, the device 10 is attached to the license plate holding area of a typical vehicle V via appropriate attachment screws 64 in similar fashion to the attachment of a typical license plate T to the vehicle V. The openings 58 on the posts 54 are dimensioned to correspond to the screw bosses on the vehicle V at the license plate attachment area of the vehicle V. The posts 54 give the second receptacle 14, as well as the first receptacle 12, clearance beyond the inset found on many modern vehicles V at the license plate holding area. The second receptacle 14 is filled with appropriate promotional discs D and batteries 42 are installed into the device 10. A desired advertisement plate A is placed into the second tag reception area of the first receptacle 12. The advertisement plate A is visible through the face portion or open area of the device 10 and serves as an advertisement display for the dealership. A customer that happens upon the vehicle V whenever no salesperson is present, depresses the actuator switch 44 which causes the actuator 38 to activate and extend its dispensing arm 40 which pushes one of the discs D out through the dispensing slot 36 in order to provide the would-be buyer with an informative disc on the vehicle under examination. An appropriate spring loading mechanism, as is well known in the art, positions the next disc D into dispensing position. In order to prevent unnecessary disc D dispensing, the time delay circuit 46 prevents the actuator 38 from again activating, irrespective on of the number of times the switch 44 is depressed, until the expiration of a time delay, which may be set within the device 10 by the dealer or may be factory present. When the vehicle V to which the device 10 is installed is to be test driven, a license plate T is inserted into the first tag reception area. The incoming tag T rests upon and depresses the depression switch 50 in order to complete the electrical circuit to the lamp 48 in order to turn the lamp 48 on for safe night driving. This is necessary due to the fact that the device 10 is offset from the normal tag holding area of the vehicle V by the posts 54 due to the need to have clearance for disc D dispensing and tag T and A insertion and removal. Such clearance places the license tag T outside of the range of the typical vehicle tag light. However, in order to preserve battery 42 life, the photoelectric sensor 52 turns the light off 48 during daylight conditions.

As the vehicle is being test driven, the stabilizer bar 60, which rests against the vehicle V, helps keep the device 10 stable against the vehicle V with the non-scuff pad 62 preventing damage to the vehicle V.

Upon completion of the test drive, the license tag T is removed from the first receptacle 12, which causes the depression switch 50 to become undepressed, which turns the lamp 48 off, if not already turned off by the photoelectric override. The advertisement tag A is once again visible and provides advertisement for the dealership.

Figure 7:
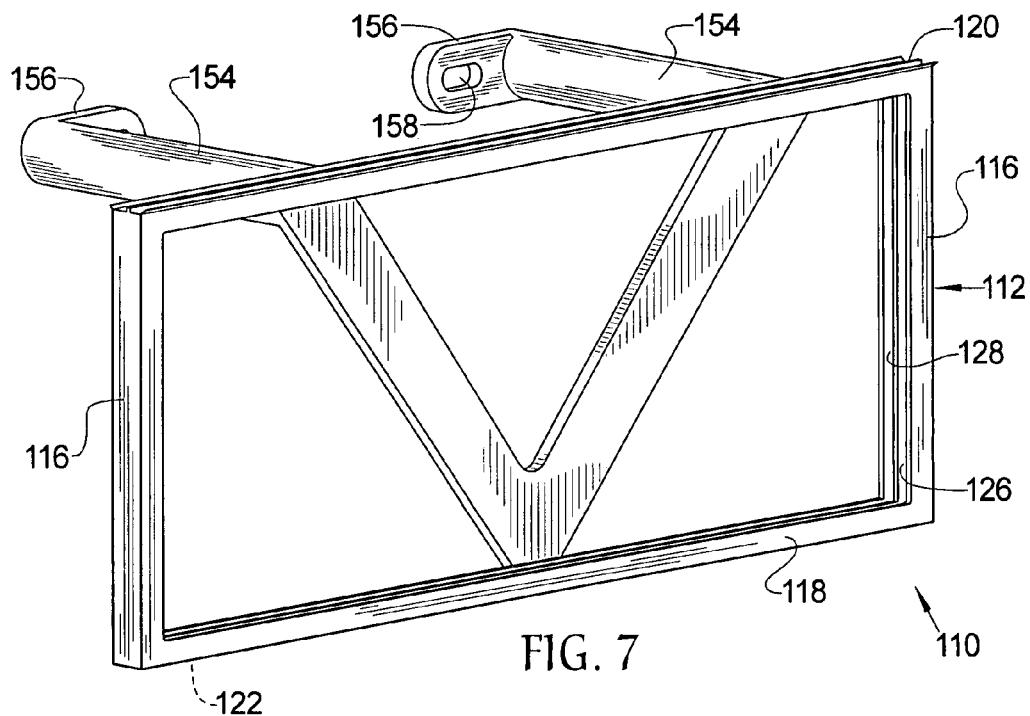
FIG. 7 is a perspective view of an alternate embodiment of the holding device attachable to a vehicle of the present invention.
Figure 8:
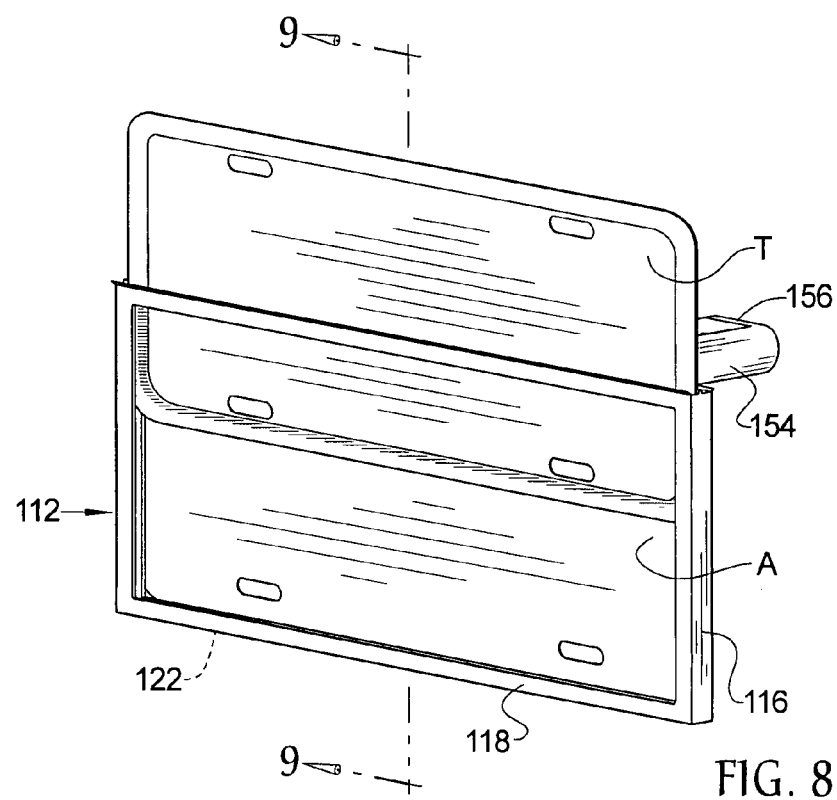
FIG. 8 is a perspective view of the alternate embodiment of the holding device attachable to a vehicle with a dealership advertisement tag in place and a test drive license plate partially installed.
Figure 9:
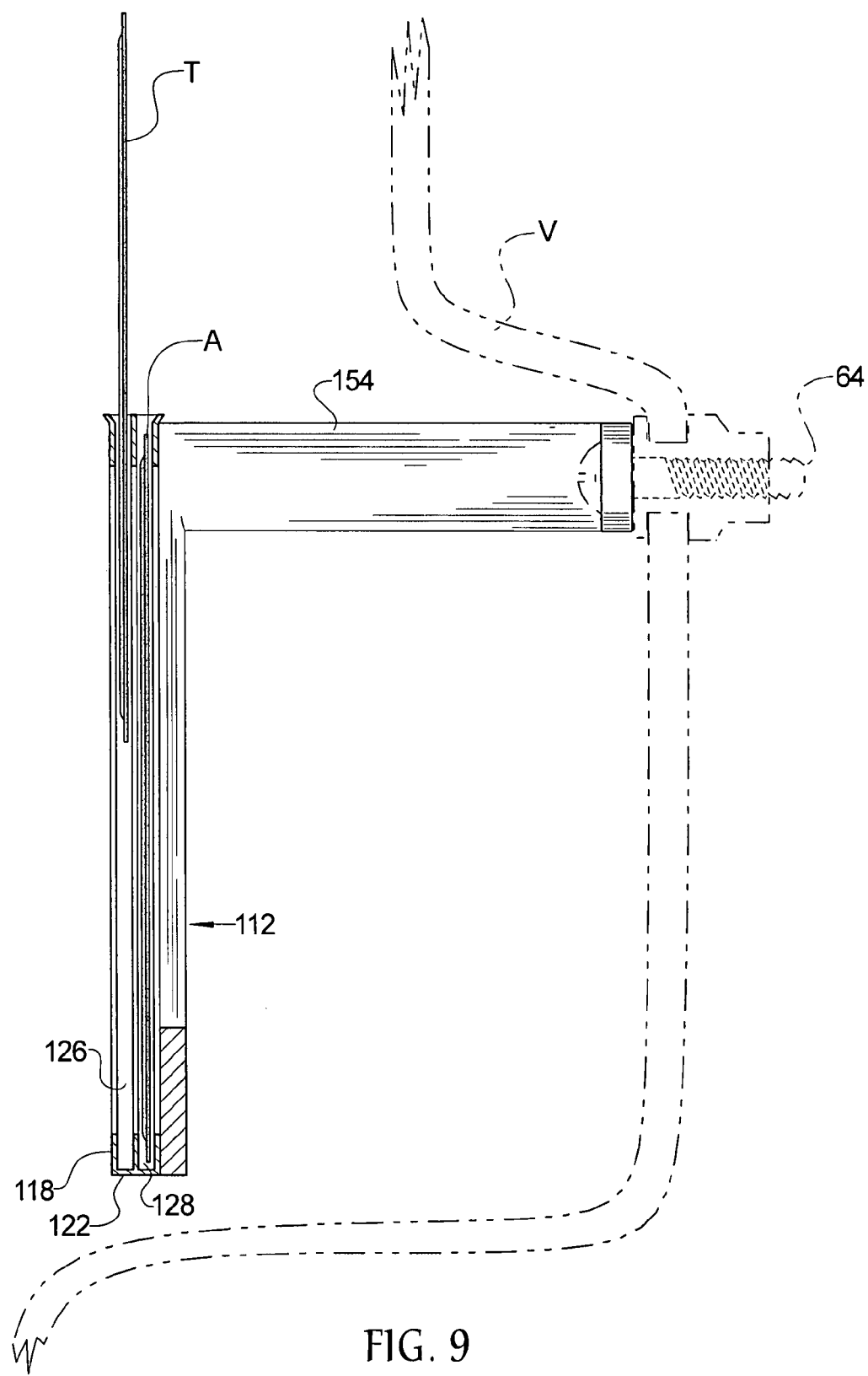
FIG. 9 is a sectional view of the alternate embodiment of the holding device attachable to a vehicle taken along line 9-9 in FIG. 8.

As seen in FIGS. 7-9, in an alternate embodiment of the holding device attachable to a vehicle 110, the device 110 simply comprise a first receptacle 112, having its sidewalls 116, bottom wall 118, open top 120, closed bottom 122 (lip not shown) and first pair of slots 126 for defining a first tag reception area and second slots 128 for defining a second tag reception area. This embodiment also has posts 154 extending rearwardly from the first receptacle 112, with each post 154 having an ear 156 with an opening 158. This embodiment 110, which is attached to the vehicle V in similar fashion to the previous embodiment, may not necessarily have a stabilizer post due to its decreased weight relative to the previous embodiment. Insertion and removal of license plates T and advertisement plates A is substantially similar to the previous embodiment.

Figure 10:
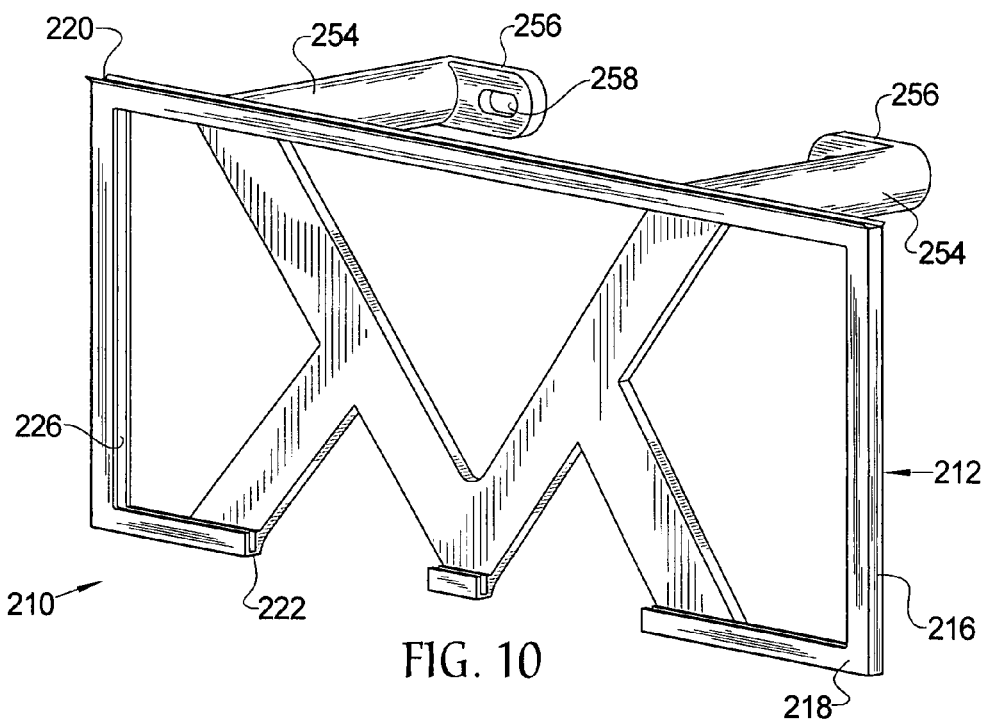
FIG. 10 is a perspective view of a second alternate embodiment of the holding device attachable to a vehicle of the present invention.

As seen in FIG. 10, in a second alternate embodiment of the holding device attachable to a vehicle 210, the device 210 also simply comprises a first receptacle 212, having its sidewalls 216, bottom wall portion 218, open top 220, closed bottom 222 (lip not shown) and just a first pair of slots 226 for defining a first tag reception area. This embodiment also has posts 254 extending rearwardly from the first receptacle 212, with each post 254 having an ear 256 with an opening 258. This embodiment 210, which is attached to the vehicle V in similar fashion to the previous embodiment, may not necessarily have a stabilizer post due to its decreased weight relative to a previous embodiment. Insertion and removal of license plates T and advertisement plates A is substantially similar to the previous embodiments.

Figure 11:
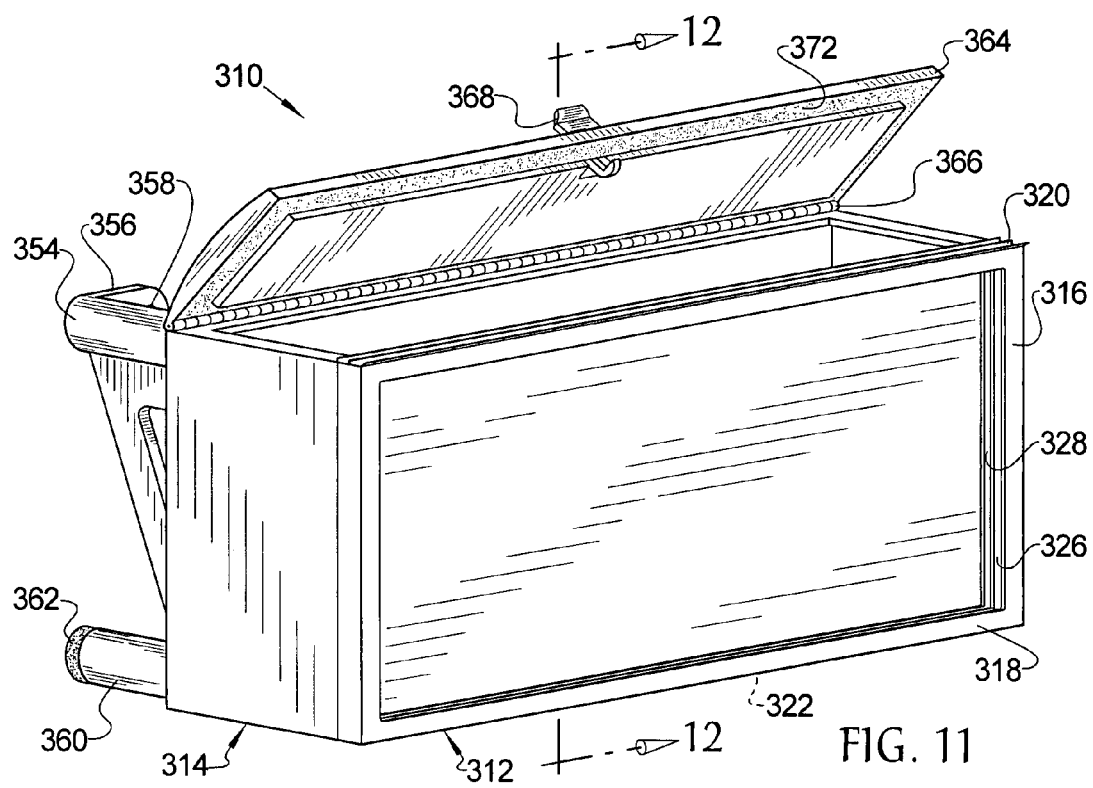
FIG. 11 is a perspective view of a third alternate embodiment of the holding device attachable to a vehicle of the present invention.
Figure 12:
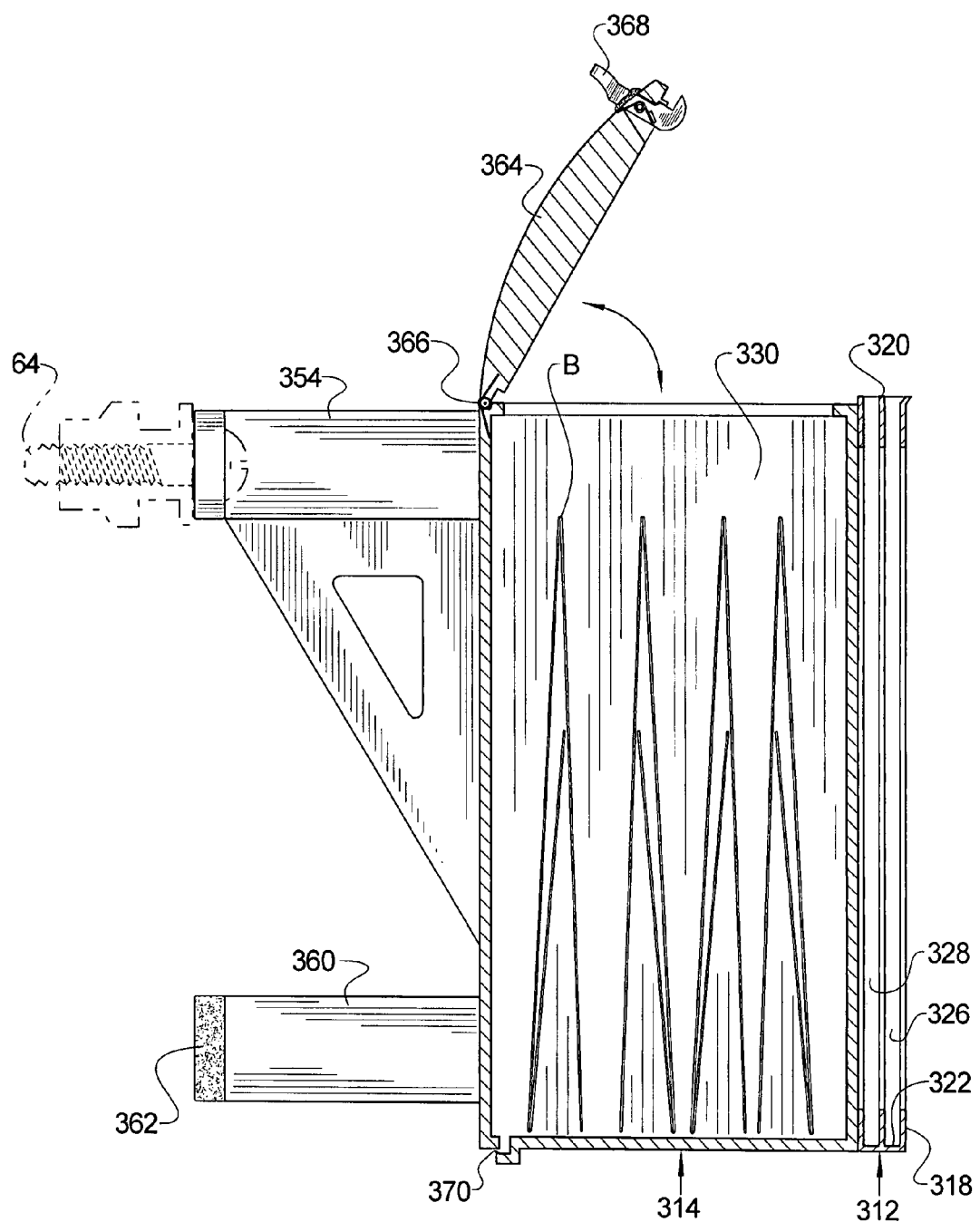
FIG. 12 is a sectional view of the third alternate embodiment of the holding device attachable to a vehicle taken along line 12-12 in FIG. 11.

As seen in FIGS. 11 and 12 in a third alternate embodiment of the holding device attachable to a vehicle 310, the device 310 comprises a first receptacle 312, having its sidewalls 316, bottom wall portion 318, open top 320, closed bottom 322 (lip not shown) and first pair of slots 326 for defining a first tag reception area and second slots 328 for defining a second tag reception area and a second receptacle 314. The second receptacle 314, has an internal chamber 330 with a lid 364 hingedly attached to the receptacle 314 via an appropriate spring-loaded hinge 366. A spring-loaded latch 368 holds the lid 364 in a normally closed position. A drain opening 370 is located at the bottom of the second receptacle 314 for draining any moisture that may enter this receptacle 314. Either discs D or appropriate brochures B may be placed within the second receptacle 314 such that a potential vehicle buyer gains access to the internal chamber 330 of the second receptacle 314 by using the latch 368 to gain such access. Once the brochure B or other marketing device is removed from the second receptacle 314 by the would-be buyer, the lid 364 is placed back into the closed position and held thereat by the latch 368. A sealing member 372 helps prevent moisture intrusion into the second receptacle 314. This embodiment 310 also has posts 354 extending rearwardly from the second receptacle 314, with each post 354 having an ear 356 with an opening 358 as well as a stabilizer bar 360 with a non-scuff pad 362. This embodiment 310 is attached to the vehicle V in similar fashion to the previous embodiments.

Figure 13:
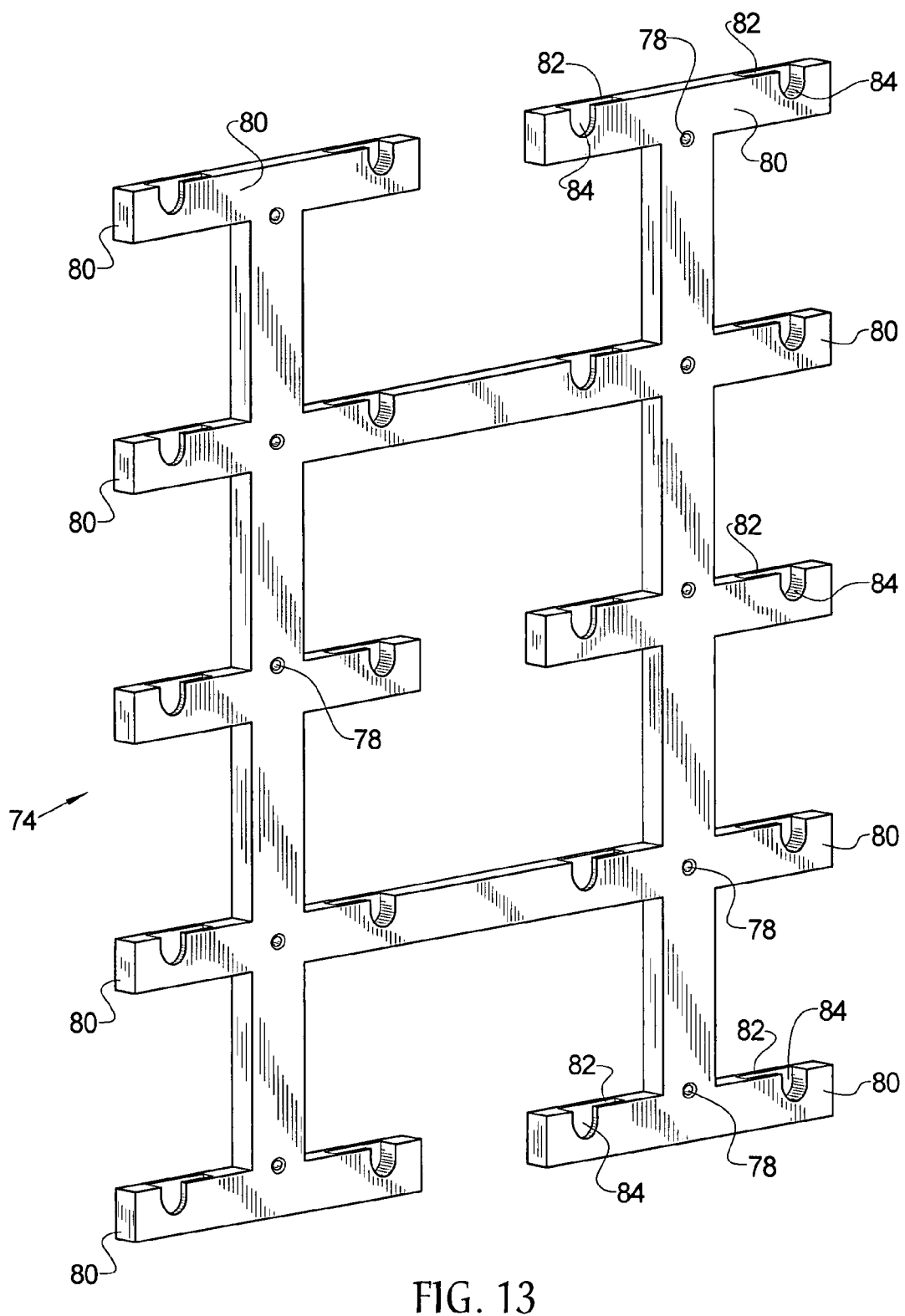
FIG. 13 is a perspective view of a holding rack used to hold the various embodiments of the holding device attachable to a vehicle.
Figure 14:
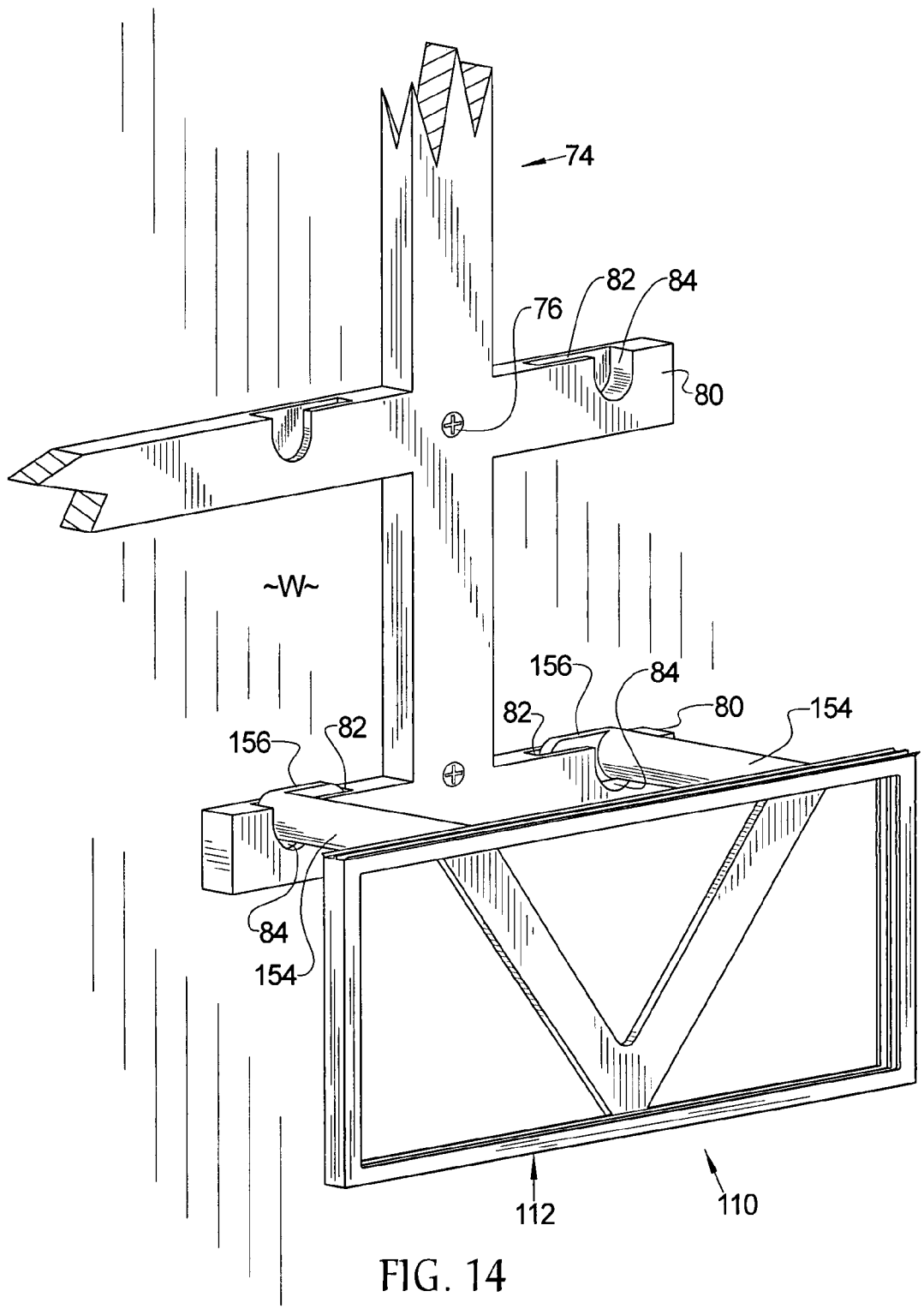
FIG. 14 is a detail perspective view of the holding device attachable to a vehicle received within the holding rack of FIG. 13.

As seen in FIGS. 13 and 14, a device holding rack 74 can be mounted to a wall W by passing appropriate screws 76 through openings 78 on the rack. The rack 74 has a plurality of receiving arms 80, each with a pair of spaced apart slots 82 thereon with an rounded opening 84 extending downwardly from each slot 82. The slots 82 each hold a respective one ear 156 of the device 110 with the opening 84 providing clearance for the posts 154 of the device 110.

While the invention has been particularly shown and described with reference to embodiments thereof, it will be appreciated by those skilled in the art that various changes in form and detail may be made without departing from the spirit and scope of the invention.

I claim:

1. A holding device attachable to the pair of license plate screw bosses of a vehicle, the holding device comprising:
   a first receptacle having sidewalls and a bottom wall forming a closed bottom, an open top, the sidewalls having a first pair of slots extending downwardly from the open top to the closed bottom, and a second pair of slots extending downwardly from the open top to the closed bottom parallel with the first pair of slots; and
   a pair of posts extending from the first receptacle, each of the pair of posts having an ear with an opening, such that the opening on each ear of each post aligns with a respective one of the pair of screw bosses.

2. The holding device as in claim 1 further comprising a second receptacle located between the first receptacle and the pair of posts.

3. The holding device as in claim 2 wherein the second receptacle has an internal chamber with an actuator with a power source therein and a switch electrically connected to the power source and the actuator such that depression of the switch causes an arm of the actuator to be adapted to dispense a disc held within the internal chamber out of the internal chamber through a slot located on the second receptacle.

4. The holding device as in claim 3 further comprising a delay circuit electrically connected to the switch such that the delay circuit imposes a time delay between subsequent actuator activation cycles.

5. The holding device as in claim 3 further comprising:
   a lamp located within the first receptacle and electrically connected to the power source; and
   a depression switch located within the first receptacle between the first pair of slots such that depression of the depression switch causes the lamp to illuminate.

6. The holding device as in claim 5 further comprising a photoelectric cell attached to the first receptacle such that the photoelectric cell measures ambient light and deactivates the lamp should the lamp be illuminated and the ambient light be above a threshold level.

7. The holding device as in claim 2 further comprising a stabilizer bar extending from the second receptacle coextensive with the pair of posts.

8. The holding device as in claim 1 further comprising a rack having a plurality of arms, each arm having a pair of third slots such that each of the pair of ears is receivable within a respective one of the pair of third slots.

9. A holding device attachable to the pair of license plate screw bosses of a vehicle, the holding device comprising:
   a first receptacle having sidewalls and a bottom wall forming a closed bottom, an open top, the sidewalls having a first pair of slots extending downwardly from the open top to the closed bottom, and a second pair of slots extending downwardly from the open top to the closed bottom;
   a second receptacle attached to the first receptacle, the second receptacle having an internal chamber with an actuator with a power source therein and a switch electrically connected to the power source and the actuator such that depression of the switch causes an arm of the actuator to be adapted to dispense a disc held within the internal chamber out of the internal chamber through a slot located on the second receptacle; and
   a pair of posts extending from the second receptacle, each of the pair of posts having an ear with an opening, such that the opening on each ear of each post aligns with a respective one of the pair of screw bosses.

10. The holding device as in claim 9 further comprising a delay circuit electrically connected to the switch such that the delay circuit imposes a time delay between subsequent actuator activation cycles.

11. The holding device as in claim 9 further comprising:
    a lamp located within the first receptacle and electrically connected to the power source; and
    a depression switch located within the first receptacle between the first pair of slots such that depression of the depression switch causes the lamp to illuminate.

12. The holding device as in claim 11 further comprising a photoelectric cell attached to the first receptacle such that the photoelectric cell measures ambient light and deactivates the lamp should the lamp be illuminated and the ambient light be above a threshold level.

13. The holding device as in claim 9 further comprising a stabilizer bar extending from the second receptacle coextensive with the pair of posts.

14. The holding device as in claim 9 further comprising a rack having a plurality of arms, each arm having a pair of third slots such that each of the pair of ears is receivable within a respective one of the pair of third slots.

15. The holding device as in claim 9 in combination with the vehicle.

16. The holding device as in claim 15 further comprising a delay circuit electrically connected to the switch such that the delay circuit imposes a time delay between subsequent actuator activation cycles.

17. The holding device as in claim 15 further comprising:
- a lamp located within the first receptacle and electrically connected to the power source; and
- a depression switch located within the first receptacle between the first pair of slots such that depression of the depression switch causes the lamp to illuminate.

18. The holding device as in claim 17 further comprising a photoelectric cell attached to the first receptacle such that the photoelectric cell measures ambient light and deactivates the lamp should the lamp be illuminated and the ambient light be above a threshold level.

19. The holding device as in claim 15 further comprising a stabilizer bar extending from the second receptacle coextensive with the pair of posts.

20. The holding device as in claim 15 further comprising a rack having a plurality of arms, each arm having a pair of third slots such that each of the pair of ears is receivable within a respective one of the pair of third slots.

* * * * *